United States Patent
Schuster et al.

(10) Patent No.: US 6,785,261 B1
(45) Date of Patent: Aug. 31, 2004

(54) METHOD AND SYSTEM FOR FORWARD ERROR CORRECTION WITH DIFFERENT FRAME SIZES

(75) Inventors: Guido M. Schuster, Des Plaines, IL (US); Ikhlaq S. Sidhu, Vernon Hills, IL (US); Michael S. Borella, Naperville, IL (US); Thomas J. Kostas, Evanston, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/322,816

(22) Filed: May 28, 1999

(51) Int. Cl.$^7$ .................. H04L 12/66; H04L 12/28; G10L 11/00

(52) U.S. Cl. .................. 370/352; 370/394; 370/400; 704/200

(58) Field of Search .................. 714/776, 740; 370/394, 350–356, 400, 401, 216, 218, 468; 375/243, 249, 253, 241; 704/200, 214, 220, 19, 231, 258, 500, 501, 503

(56) References Cited

U.S. PATENT DOCUMENTS

| | | | | |
|---|---|---|---|---|
| 5,768,527 A | * | 6/1998 | Zhu et al. | 370/229 |
| 6,167,060 A | * | 12/2000 | Vargo et al. | 370/468 |
| 6,259,691 B1 | * | 7/2001 | Naudus | 370/352 |
| 6,259,695 B1 | * | 7/2001 | Ofek | 370/389 |
| 6,304,567 B1 | * | 10/2001 | Rosenberg | 370/356 |
| 6,356,545 B1 | * | 3/2002 | Vargo et al. | 370/355 |
| 6,405,338 B1 | * | 6/2002 | Sinha et al. | 714/752 |

OTHER PUBLICATIONS

Rosenberg, J. et al., An RTP Payload Format for Generic Forward Error Correction, draft–ietf–avt–fec–03.txt, Internet Engineering Task Force, Internet Draft, pp. 1–16, Jul. 30, 1998.

Perkins, Colin et al., RTP Payload for Redundant Audio Data, draft–ietf–avt–redundancy–revised.00.txt, Internet Engineering Task Force, Internet Draft, pp. 1–10, Aug. 3, 1998.

* cited by examiner

Primary Examiner—Hanh Nguyen
(74) Attorney, Agent, or Firm—McDonnell Boehnen Hulbert & Berghoff LLP (57) ABSTRACT

A mechanism for recovering data associated with lost packets, suitable for use in a VoIP network. The telecommunications network is preferably a packet switched network having IP telephony gateways serving as interfaces between a telephone device and the IP network. The IP telephony gateway receives a conversation signal from the telephone device, and implements an improved forward error correction method. The method includes generating payload information defined by at least two packet sequences from the same audio information, and transmitting those two packet sequences on the IP network for receipt by a remote network device. The packet sequences are transmitted using RTP with two independent data streams or, alternatively, using a single data stream. The first and second data streams are data packet streams each defining a sequence of data packets. The first data stream is preferably formed using a G.711 vocoder, and the second data stream is preferably formed using a G.723.1 vocoder. The receiver inserts the G.711 packets into a receive buffer, and, in the event that G.711 data is missing or corrupted, the receiver will decode the relevant G.723.1 packets and place it in the buffer in the appropriate location. The buffered data is then used to reproduce the audio information at the receiver.

12 Claims, 5 Drawing Sheets

METHOD AND SYSTEM FOR FORWARD ERROR CORRECTION WITH DIFFERENT FRAME SIZES

BACKGROUND OF THE INVENTION

1. Field of the Invention

The present invention relates to data transmission systems and more particularly to a method and apparatus for facilitating correction of data loss in such a system. The invention is suitable for use in any telecommunications network or transmission path that includes an end-to-end or node-to-node connection for communication of multiple data streams between a pair of devices.

By way of example, and without limitation, the invention will be described in the context of transmitting packet based real time voice, video, both voice and video, or other media signals over a packet switched computer network, for use in internet-based telephony (e.g., voice over IP (VoIP)). These are generally referred to herein as multimedia signals. However, the invention may also be suitably employed to transmit other types of signals and over other networks (such as local area (LAN), metropolitan area (MAN) or wide area (WAN) networks, and circuit switched networks, for example) or direct end-to-end connections, as well as with other transmission protocols.

2. Description of the Related Art

Packet switched networks now provide interactive communications services such as telephony and multi-media conferencing. In the context of packet switched networks operating according to the Internet Protocol (IP), this technology is presently known as internet telephony, IP telephony or, where voice is involved, Voice over IP (VoIP).

VoIP presents an attractive technology for use in long distance telephone calls, as compared to the public switched telephone network (PSTN), which has been the traditional transmission medium. The advantage of VoIP calls over PSTN calls is cost. In the United States, for instance, long distance service providers for the PSTN provide domestic services at rates ranging from roughly 10 to 30 cents per minute, and international rates for substantially more, depending on the time of day, day of the week, and the distances involved. In contrast, the cost of a VoIP call anywhere in the world is potentially the cost of a local telephone call to a local internet telephony service provider at one end and the cost of a local call from an internet telephony service provider at the far end to the destination telephone. Once the call is routed from the local VoIP provider onto the IP network, the cost to transmit the data from the local internet telephony provider to the far end internet telephony provider can be free for all practical purposes, regardless of where the two parties are located, Similarly, the cost to facilitate a direct dial internet telephony call can theoretically be free, except for possible access fees charged by local exchange carriers. VoIP service providers can thus potentially charge users far less for VoIP calls than the users would pay for comparable calls placed strictly over the PSTN.

a. Packet Switched Network Communications

In a packet switched network, a message to be sent is divided into blocks, or data packets, of fixed or variable length. The packets are then sent individually over the network through multiple locations and then reassembled at a final location before being delivered to a user at a receiving end. To ensure proper transmission and re-assembly of the blocks of data at the receiving end, various control data, such as sequence and verification information, is typically appended to each packet in the form of a packet header. At the receiving end, the packets are then reassembled and transmitted to an end user in a format compatible with the user's equipment.

To facilitate packet-based communication over interconnected networks that may include computers of various architectures and operating systems, the networks and computers typically operate according to an agreed set of packet switching protocols. A variety of such protocols are available, and these protocols range in degree of efficiency and reliability. Those skilled in the art are familiar, for instance, with the Transport Control Protocol/Internet Protocol (TCP/IP) suite of protocols, which is used to manage transmission of packets throughout the Internet and other packet switched networks.

Each protocol in the TCP/IP suite is designed to establish communication between common layers on two machines, or hosts, in the network. The lowest layer in the Internet is the "physical" layer, which is concerned with ensuring that actual bits and bytes of information pass along physical links between nodes of the network. The next layer is the link layer, which ensures a reliable connection between nodes in the network. The next layer is the "network" or "IP" layer, which is concerned with permitting hosts to inject packets of data into the network to be routed independently to a specified destination. The next layer in turn is the "transport" layer, which is concerned with allowing peer entities on source and destination hosts to carry on a conversation. Generally speaking, the IP and transport layers of the Internet are not concerned with the physical arrangement of the network, such as whether source and destination machines are on the same sub-network or whether there are other sub-networks between them.

The transport layer of TCP/IP can utilize two end-to-end protocols, TCP (Transport Control Protocol) and UDP (User Datagram Protocol). TCP is a reliable connection-oriented protocol, which includes intelligence necessary to confirm successful transmission between the sending and receiving ends in the network. UDP, in contrast, is an unreliable connectionless protocol, which facilitates sending and receiving of packets but does not include any intelligence to establish that a packet successfully reached its destination. In general, UDP is used by applications that do not want TCP's sequencing or flow control and wish to provide their own.

According to UDP, the transport layer takes a data stream to be transmitted and breaks it up into independent connectionless segments or "datagrams." UDP adds to each of these packages an 8 byte header, which includes overhead information such as a source port number, a destination port number and a length and a checksum designed to allow the receiving end to properly reassemble the datagrams into the original message. The transport layer then "passes" each of these packages to the IP layer.

The IP layer in turn adds another header to each package, providing additional overhead information, such as a source IP address and a destination IP address. The IP layer then transmits the resulting packages through the Internet, possibly fragmenting each package into pieces as it goes. As the pieces of the package finally reach the destination machine, they are reassembled by the IP layer and passed to the transport layer.

For real time data or media signals (such as voice or video) to be transmitted over packet switched networks, the packets to be transmitted may be encapsulated by one or more additional header layers according to established higher level protocols. An example of one such higher level protocol is Real Time Protocol or RTP. RTP may provide each packet with at least a 12 byte header containing timestamps and sequence numbers. Included in this header may be a 7 bit payload type, which may define the type of payload in the underlying data packet. In practice, when the transmitting and receiving network ends establish communication of such signals, they will negotiate a mutually acceptable meaning for these RTP payload types. By way of example, the RTP payload type may indicate the type of voice or video codec (e.g., G.729, G.723.1, etc.) used to compress the underlying media signal, thereby facilitating proper decoding at the receiving end.

Packet switched networks such as the Internet thus serve to provide end-to-end (or node-to-node) communication between a pair of network devices or machines. These network devices may access or be connected to the Internet through any suitable configuration. In a usual arrangement, for instance, each device is connected via a communications link (such as the public switched telephone network (PSTN) or a LAN) to a server or gateway that provides access to the Internet. The gateway is typically owned and operated by an Internet service provider (ISP) and is known as a network access server (NAS) or remote access server (RAS).

Of course, the gateway itself may also be considered a network device or machine, as it serves to communicate over the network with a machine (e.g., another gateway) at another end or node.

Network access servers are commercially available from 3Com Corporation and other telecommunications equipment manufacturers such as Ascend Communications, Livingston Enterprises, and Multitech. A representative NAS is the Total Control Enterprise Network Hub from 3Com Corporation, as described in the patent of Dale M. Walsh, et al., U.S. Pat. No. 5,597,595 ("the Walsh patent"), which is fully incorporated herein by reference. This NAS has a telephone line interface that can be connected to a high-speed multiplexed digital telephone line, such as a T1 line or an ISDN line. The NAS further provides a plurality of digital modems to perform signal conversions (such as voice or video encoding) on the data from the telephone line channels and a bus network connecting the digital modems to a network interface card or module. Examples of such network interface cards are the NetServer™ and EdgeServer™ cards from 3Com Corporation. The network interface card in turn couples the NAS to a local or wide area network, such as the ISP backbone network or the Internet.

While packet switched networks have traditionally been used to carry non-realtime transmissions (such as e-mail messages or other data transfers), one of the promising new uses of these networks is to carry telephone conversations and other interactive communications. Known as "IP telephony" in the context of IP networks, the goal of this new technology is to replace or enhance conventional circuit switched telephone networks with more versatile and universal packet switched communications.

Figure 1:
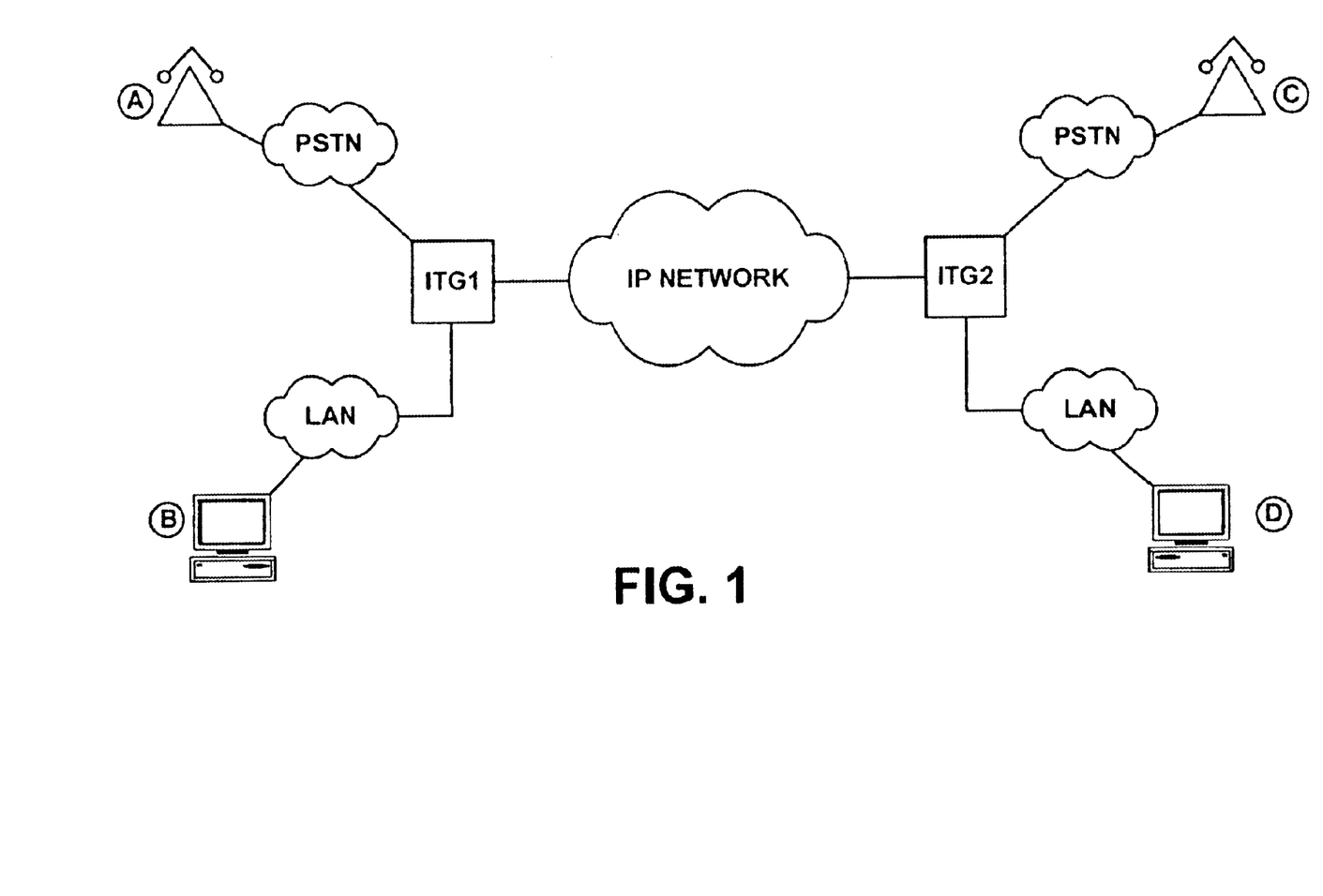
FIG. 1 illustrates a basic IP telephony configuration.

FIG. 1 illustrates a basic IP telephony configuration. In this configuration, users at two or more telephone devices are set to engage in a conversation over an IP network. Each telephone device may take any of a variety of forms. For instance, without limitation, the device may be a conventional analog telephone or a personal computer (PC) equipped with a handset (or a microphone and speakers) to facilitate a conversation. Each telephone device is served by an IP telephony gateway (ITG), which is owned by an IP telephony service provider (ITSP) and provides connectivity to the network. In practice, users may subscribe to the service provided by an ITSP and may then place and receive calls over the IP network via a communications link to their respective gateways.

The communications link may take any suitable form. For instance, if the telephone device is a conventional telephone, the communications link may be the conventional PSTN, with a T1 span extending to the ITG. In that case, a subscriber may place a call to the ITG over the PSTN. As another example, if the telephone device is a PC on a LAN, the communications link may be the LAN extending to the ITG. In that case, a subscriber may contact the ITG via the existing network connection. Of course, other suitable communications links are known or will be developed as well.

The ITG may take the form of a network access server similar to those described above, modified to the extent necessary to facilitate telephone conversations over the network. For instance, while the modems in a conventional NAS modulate and demodulate signals to communicate with subscribers' PC modems, the "modems" in an ITG may not need to modulate or demodulate signals. Instead, the modems may be configured to receive the telephone signals originating at subscriber telephone devices and to sample (if necessary), compress and packetize the signals for transmission over the network, and vice versa for signals coming from the network.

Like other network access servers, an ITG will typically receive and process a plurality of telephone conversation signals from subscriber devices and transmit these signals in parallel over the IP network to a destination gateway. At a given moment, for instance, the ITG may simultaneously receive a plurality of unrelated speech signals from a given communications link such as a T1 span, process those signals as necessary, and place a series of corresponding RTP packets onto the network in one or more outgoing packet streams for transmission to a destination gateway.

b. Packet Loss, and Error Correction Efforts

Ideally, all of the packets transmitted into a packet switched network by the ITG should arrive successfully at the designated remote gateway, for conversion as necessary and transmission to the destination device. Either the remote gateway or the destination device, as the case may be, should then receive the transmitted IP packets, extract the payload from the packets and reconstruct an ordered data stream or signal for receipt by an end user.

Unfortunately, however, deficiencies in the existing communication infrastructure have precluded the successful widespread transmission of real time media signals, such as digitized voice, audio and video, from end-to-end over packet switched networks. One of the principles reasons for this lack of success is a high rate of packet loss and delay.

The Internet, for example, suffers from a high rate of packet loss and resulting transmission delays. In particular, depending on conditions such as how congested the Internet is at any given time, loss of entire packets has been found to occur on the Internet at a rate of up to 25%, or up to one in every four packets. Typically, this packet loss occurs one packet at a time, which might or might not perceptibly distort a real-time audio signal, but may perceptibly distort a real-time video signal, and would certainly distort a pure data signal such as an e-mail message. Often, however, burst errors occur on the Internet and result in the loss of multiple sequential packets in a row. Unlike the sporadic loss of a single packet, if left uncorrected, these burst errors can and will substantially and perceptibly distort almost any transmitted signal.

The connection-oriented TCP protocol provides a mechanism for responding to packet loss in an IP network. According to TCP, when a segment arrives at its destination, the receiving TCP entity should send back to the sending entity a segment bearing an acknowledgement number equal to the next sequence number that it expects to receive. If the sending entity does not receive an acknowledgement within a specified time period, it will re-transmit the package of data.

Generally speaking, this acknowledgment and re-transmission system works well to correct for packet loss. However, the system can unfortunately delay the complete transmission of a data stream. For the transmission of packets representing pure data signals such as e-mail messages, transmission delay is not ideal, although it is of secondary concern compared to an unrecoverable loss of information. Real-time media signals, however, are by definition highly sensitive to delay and will appear jumpy, interrupted or otherwise distorted if parts of the signal do not flow continuously to the receiving end. Further, in the context of interactive real-time communications such as packet-switched telephony, delay is even more problematic, since participants to such communications expect the network connection to simulate immediate, in-person interaction, without delay.

c. Forward Error Correction

Rather than employing (or invoking) an acknowledgement and retransmission system, less delay in packet loss correction can be achieved by transmitting a correction code of some sort concurrently with the payload data, thereby providing the receiving end with sufficient information to recover lost packets. Several error correction code mechanisms are available for this purpose. These mechanisms include, for instance, convolution coding, interleaving and block coding, all of which are well known to those skilled in the art. Of these mechanisms, perhaps the most common is block coding.

Block coding calls for mapping a frame of source data into a coded block of data that includes a set of redundant parity symbols. By conventional terminology, an "(n, k)" block coder typically converts a group of k payload units (such as bytes or bits) from a data stream into a larger group of n units by deriving $p=n-k$ parity units or forward error correction (FEC) codes. Each parity unit is generated through a predetermined coding technique based on all or some subset of the k payload units.

The parity units may then be transmitted in-stream with the underlying payload units (e.g., interleaved with the payload, or after the payload, or appended to the payload). Alternatively or additionally, the parity units may be transmitted in a separate stream in parallel with the underlying payload stream. This latter technique is described, for instance, in J. Rosenberg, H. Schulzrinne, An RTP Payload Format for Generic Forward Error Correction, Internet Engineering Task Force, Internet Draft, July 1998, the entirety of which is hereby incorporated herein by reference.

Many forms of block coding are now known. One of the simplest forms of a block code, for instance, is a repetition code, in which the source data is repeated as a set of parity bits. One of the more popular but complex block codes is the Reed-Solomon (RS) class of codes over the $2^8$ Galois field. These codes are optimal in their ability to correct erased bytes. For example, provided that 8 bytes are protected with 3 parity bytes (a total of 11 bytes), any three bytes can be lost, and the original 8 bytes may still be recovered.

Another example of block coding is to append or concatenate redundant parity information to existing data packets in the packet stream. For instance, as an offshoot of traditional repetition codes, the transmitting node may append to each data packet redundant copies of the preceding k number of data packets. In this way, the receiving end may readily recover a lost packet $D_i$ from one of the k subsequent packets $D_{i+1} \ldots D_{i+k}$. As more preceding packets are concatenated with each current packet in the stream, the network can then tolerate a higher rate of packet loss.

Still another block coding technique is described in co-pending U.S. patent application Ser. No. 08/989,616, entitled "A Forward Error Correction System for Packet Based Real Time Media" and filed on Dec. 12, 1997, the entirety of which is hereby incorporated by reference. According to this technique, parity bits associated with current packets are piggy-backed onto future packets. In particular, as a sequence of payload blocks is being transmitted, every k payload blocks in the sequence are fed through a block coder to create $p=n-k$ forward error correction (FEC) codes or parity packets, where $p \leq k$. Each of these p parity packets may then be concatenated respectively with one of the next p data packets being transmitted. In turn, at the receiving end, if a packet is lost, the associated payload may be extracted from the parity blocks carried by the appropriate subsequent group of packets.

Yet another coding technique is described in U.S. patent application Ser. No. 08/989,483, also entitled "A Forward Error Correction System for Packet Based Real Time Media" and filed on Dec. 12, 1997, the entirety of which is also hereby incorporated by reference. According to this technique, a single parity block p may be derived as an XOR sum of the payload carried by the preceding k packets in the stream and then concatenated with the current packet for transmission. With this technique, regardless of the number of sequential packets to be recovered at the receiving end, the size of the forward error correction code remains of the same order as the payload itself.

While each of these forward error correction coding techniques has its advantages, the existing techniques still suffer from at least one inherent disadvantage: delay. In particular, since the parity information, p, is derived as some function of group of preceding payload information, k, the receiving end will usually not receive the parity information until it first receives all of the payload information. Therefore, in response to a loss of some payload information, the receiving end will need to wait until the necessary parity information arrives in order to recover the lost information.

Further, provided with a complex coding scheme in which a number of the k payload units (as well as the parity unit(s)) are required in order to recover from a loss of one or more of the k payload units, the receiving end will need to wait until all of those necessary payload units arrive as well. Thus, regardless of whether the parity units for a given stream are transmitted in-stream with the underlying payload or in a separate FEC stream, some additional delay will inherently occur in responding to packet loss.

As noted above, any such delay is problematic in the context of real time media transmissions and particularly so in the context of interactive network communications such as IP telephony. While one way to reduce this delay may be to use less complex FEC schemes (such as simple repetition codes), that solution is likely to be unacceptable as the quality of error correction may decrease and the bandwidth may increase.

In view of these deficiencies in the existing art, a need exists for an improved system of forward error correction coding.

SUMMARY OF THE INVENTION

The present invention provides a simple yet elegant mechanism for improved end to end transmission of real time audio or voice signals. In addition, video, both voice and video, or other media signals may be sent. These are generally referred to herein as multimedia signals. For convenience, the invention will be described primarily with reference to audio signals. But it should be understood that the description applies equally to multimedia signals generally. In the context of VoIP, the telecommunications network comprises of a packet switched network and an IP telephony gateway serving as an interface between a telephone device and the IP network, the IP telephony gateway receives a conversation signal from the telephone device. At least two different digital encoding systems are employed on a single audio source. In one preferred embodiment, for instance, both the G.711 and G.723.1 encoding standards simultaneously produce two different sets of data for the identical conversation. By way of illustration, the preferred embodiment utilizes a high-level time-conscious protocol RTP. Two different sets of coded data are transmitted simultaneously through two separate RTP packet streams. The G.711 stream contains frames of 10 milliseconds worth of audio samples whereas the G.723.1 stream contains 30 milliseconds worth of audio samples. Both streams are frame aligned, it follows that when every three G.711 frames are sent on the G.711 stream, a G.723.1 frame representing the same information in the three sent G.711 frames will be transmitted shortly after on the G.723.1 stream. It must be noted that in other embodiments, data samples of alternative time lengths are possible and standards other than the G.711 and G.723.1 are also possible.

In this preferred embodiment, the receiving end of the VoIP conversation would preferably buffer and decode the frames back into audible signals from the G.711 stream. The G.723.1 stream is preferably ignored and left undecoded. In the event of packet loss on the G.711 stream, the lost information is recovered from the G.723.1 stream. Further, due to the frame alignment aforesaid and the timestamp feature of RTP, the G.723.1 frame from which the FEC information is to be derived and decoded can be easily located.

Alternatively, in another embodiment, the simultaneous transmission of G.711 and G.723.1 frames uses only one RTP stream. In this manner, the voice signal is, once again, subjected to both G.711 and G.723.1 coding and produces simultaneously two different sets of digital code representing the voice signal. However the transmission method is different. For every 30 millisecond segments of VoIP audio, two G.711 frames each having 10 milliseconds of data would be transmitted separately and the remaining G.711 packet having 10 milliseconds of data would be transmitted together with 30 milliseconds of data in a G.723.1 frame corresponding to the three 10 millisecond G.711 frames. Hence a total of three frames are transferred on a single RTP stream. Once again, in the event of a data loss, the G.723.1 frame already received would be decoded for FEC information. It must also once again be noted that in other embodiments, data samples of alternative time lengths are possible and standards other than the G.711 and G.723.1 are also possible.

The preferred embodiment using a single RTP stream is more efficient when compared with the dual RTP streams. More overhead is involved in establishing two streams. By using a single stream, there is no increase in overhead. However, in a dual stream embodiment, there is a 33% increase in packet count with the extra and separate transmission of G.723.1 frames. Finally, in the single stream embodiment, when the packet containing both the G.711 and G.723.1 code is lost, then the FEC information is unavailable and reconstruction may not be possible.

Nonetheless, the availability of the different frames renders the transmission of data practically redundant in the preferred embodiment. Upon the loss of any data, FEC, according to he present invention allows simultaneous or near-simultaneous recovery from the alternate frames. As a result, in the context of VoIP, the resulting telephone conversation may be carried out in a coherent and satisfying manner, without concern from audio loss in transmission.

The foregoing as well as other advantages of the present invention will become apparent to those of ordinary skill in the art by reading the following detailed description, with appropriate reference to the accompanying drawings.

BRIEF DESCRIPTION OF THE DRAWINGS

A preferred embodiment of the present invention is described herein with reference to the drawings, in which.

DETAILED DESCRIPTION OF THE PREFERRED EMBODIMENT

The present invention facilitates improved end-to-end communication using parallel data streams over a data network or other communication path. Specifically, the parallel data streams represent sampled voice data for a single end-to-end VoIP conversation. The invention is particularly well suited for use in the context of interactive network communications that involve the simultaneous end-to-end (or node-to-node) transmission of voice data streams on a packet network. As noted above, for purposes of illustration, the invention will be described in the context of IP telephony or, more generally, voice over IP (VoIP).

A mechanism for recovering data associated with lost packets, suitable for use in a VoIP network is provided. The telecommunications network is preferably a packet switched network having IP telephony gateways serving as interfaces between a telephone device and the IP network. The IP telephony gateway receives a conversation signal from the telephone device, and implements an improved forward error correction method. The method includes generating payload information defined by at least two packet sequences from the same audio information, and transmitting those two packet sequences on the IP network for receipt by a remote network device. The packet sequences are transmitted using RTP with two independent data streams or, alternatively, using a single data stream. The first and second data streams are data packet streams each defining a sequence of data packets. The first data stream is preferably formed using a G.711 vocoder, and the second data stream is preferably formed using a G.723.1 vocoder. The receiver inserts the G.711 packets into a receive buffer, and, in the event that G.711 data is missing or corrupted, the receiver will decode the relevant G.723.1 packets and place it in the buffer in the appropriate location. The buffered data is then used to reproduce the audio information at the receiver.

In practice, to place a telephone call over the IP network, a caller operating a telephone device (such as a telephone or PC, for example) may connect to a local IP telephony gateway (ITG) via a suitable communications link (such as the PSTN and/or another network, for example). Once this connection is established, the local ITG may receive from the calling device an indication of a called party number, and perhaps a caller personal identification number (PIN). Based on the destination phone number, the local ITG may then query a translation table in a pre-established database, to identify an IP address that corresponds to a remote ITG serving the destination telephone number. Provided with the destination IP address, the local and remote ITG may then set up packet-based communication, and the local ITG may transmit to the remote gateway packets representing the caller's voice. In turn, the remote gateway should ideally receive the transmitted packets, reconstruct a packet stream, and forward a suitable voice signal to the destination telephone device.

Figure 2:
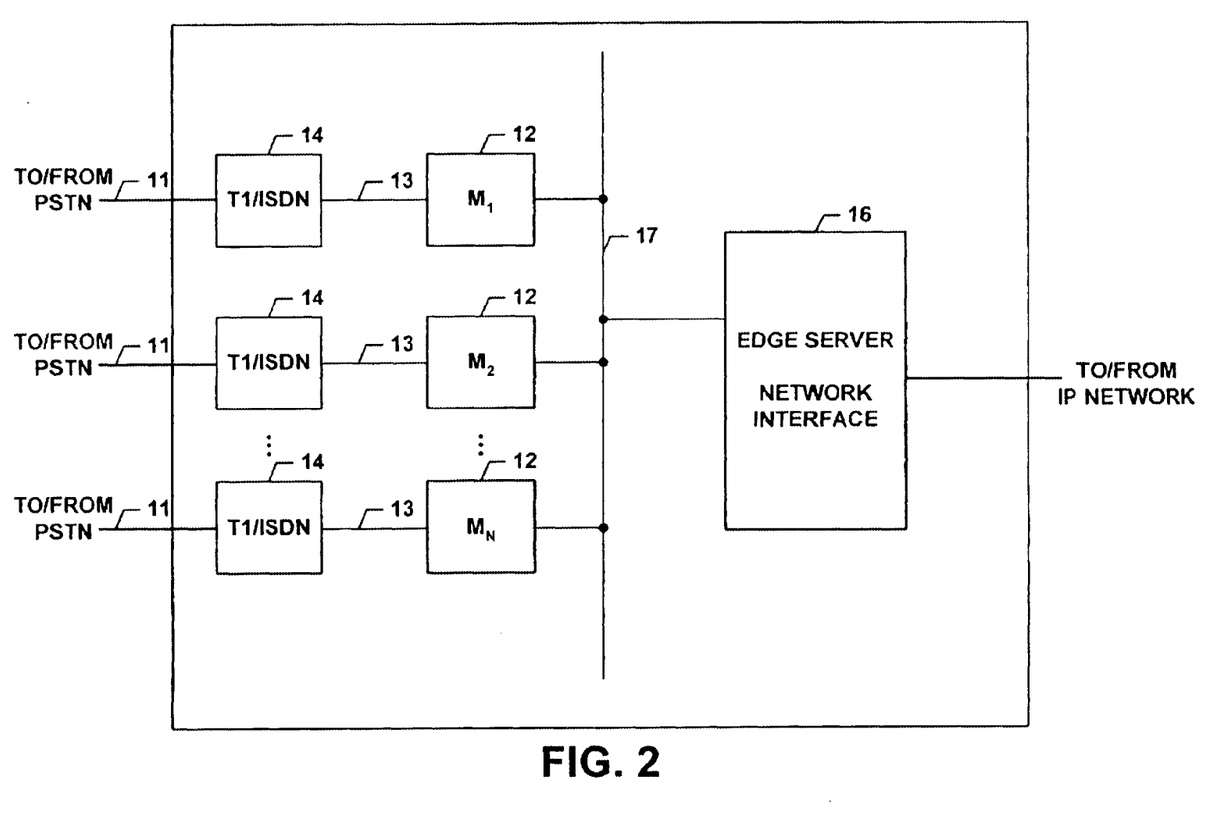
FIG. 2 illustrates a simplified block diagram of an IP telephony gateway suitable for employing the present invention.

In the context of VoIP, the present invention may be employed in an ITG that is suitable for conveying multiple packet streams simultaneously over an IP network. FIG. 2 shows a simplified block diagram of one such ITG 10 by way of example. The details of a network access server similar in configuration to this ITG are disclosed in the Walsh patent, which has been incorporated herein by reference, and the reader is therefore directed to the Walsh patent for such details. Of course, other ITG configurations now known or later developed could be suitable as well. Further, the present invention may be employed in other network devices, such as, for example, a LAN server or PBX server.

Referring to FIG. 2, exemplary ITG 10 includes a plurality of high density digital modem modules 12, each having a T1/ISDN telephone line interface 14. The high density digital modem modules 12 communicate with a network interface 16 over a packet system bus 17. The high density digital modem modules, the telephone interfaces and the network interface are preferably on individual printed circuit boards or cards arranged in a chassis. The high density digital modem modules are "high density" in that each contains a high density digital signal processing (DSP) configuration capable of handling 23, 24 or 30 DS0 channels. An exemplary high density DSP is the HiPer™ DSP available from 3Com Corporation.

By providing a set of high density digital modem cards 12 and a robust computing platform in the network interface 16, a single chassis can process many hundreds of calls through the device simultaneously. In this regard, each digital modem card 12 performs modem functions for a large number of channels on the telephone line. For example, each high density digital modem card 12 may perform modem functions for 23 B channels plus 1 D channel for an ISDN Primary Rate Interface, 24 DS0 channels for a T1 line and 30 channels for an E1 line.

In the exemplary ITG of FIG. 2, each high density digital modem card 12 has its own T1/ISDN telephone line interface 14 connected to an ISDN PRI or T1 line. The T1/ISDN telephone line interface 14 is connected to the high density digital modem cards by a TDM bus 13, as described in the Walsh patent. The T1/ISDN telephone line interface 14 is composed of two separate modules (not shown), an incoming call interface module and an incoming call application module. The interface module physically receives the incoming T1 span lines at connection 11, converts the signal into a digital format and delivers the signal to the incoming call application module. The interface module provides a channel switching unit (CSU) interface, which recovers clock signals and data from the incoming T1 signals, and also provides the transmission of outgoing digital telephone signals representing digital data to the T1 line at connection 11. The application module provides framing of recovered T1 data to extract the T1 DS0 channel data and then switches the channel data twenty four time slots on a TDM bus 56 to the corresponding high density modem module 12. Of course, the telephone interface may take other forms as well.

The high density digital modem cards 12 are connected to the network interface card via a high-speed parallel packet bus 17, similar to that described in the Walsh patent. The number of high density digital modem cards 12 and associated telephone line interface cards 14 is essentially arbitrary, but 10 to 24 such cards are typical in a high density gateway application today, providing modem functionality for between 240 and 576 DS0 channels.

The network interface or EdgeServer™ card 16 consists of a general purpose computing platform (such as an IBM PC) running an operating system, such as Windows NT™ from Microsoft Corporation or UNIX. The network interface card 16 contains software and hardware modules to perform call routing, modem configuration and other features as set forth and described for the gateway modules in the Walsh patent as well as in the patent of Baum et al., U.S. Pat. No. 5,577,105, which is also fully incorporated herein by reference. Further details of the design and features of the EdgeServer™ card 16 are set forth in the U.S. patent application of Verthein et al., application Ser. No. 08/813, 173, which is fully incorporated herein by reference as well.

Figure 3:
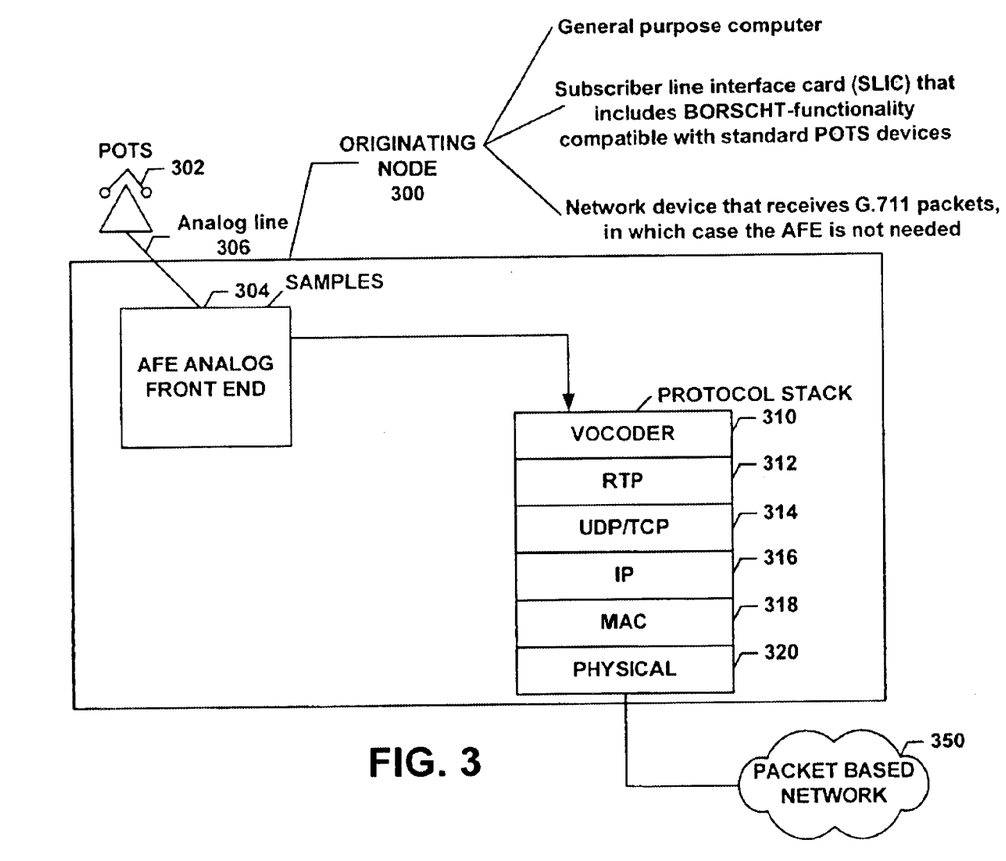
FIG. 3 illustrates a preferred embodiment of the IP telephony interface that implements a preferred forward error correction scheme.

By way of illustration but without limitation, FIG. 3 shows an embodiment of an interface 300 for connecting a subscriber (e.g., a legacy POTS device) to the ITG. Shown in FIG. 3 are the internal connections used to transmit a real-time voice signal over a packet switched network. The embodiment depicted in FIG. 3 is designed to interface directly to a POTS legacy device. The interface would take the place of the PSTN interface 14 and digital modem module 12 in the telephony server of FIG. 2. Alternatively, the originating node 300 may also be a general purpose computer. In either case, the voice signal from a POTS telephone 302 is transmitted to the IGT of a packet based network 350 via an analog line 306. The originating node, or subscriber line interface card (SLIC) 300 includes BORSCHT functionality compatible with standard POTS devices. The voice signal from the analog line 306 is received by an Analog Front End (AFE) 304. The AFE samples the voice signal and delivers the samples to a vocoder unit 310. The vocoder unit codes and compresses the voice signal according to established media coding standards, such as the G.711 and G.723.1 standards. In a further embodiment, originating node 300 can take the form of a network device that receives coded packets (in which case an Analog Front End (AFE) 304 would not be necessary).

One form of digital coding is a waveform coding method known in the art as Pulse Code Modulation (PCM). PCM samples the voice signal at a rate of 8 kHz and digitally encodes each sample as an 8 bit PCM word. G.711 is a standard that encodes voice frequency signals using PCM published by the International Telecommunication Union, the entirety of which is incorporated herein by reference. G.711 waveform coding quantizes the sampled signal into a compressed digital audio signal before transmission.

G.711 encodes signals sampled at 8 kHz signals into 8-bit words for transmission over 64 kbps channels. There are two variants within G.711, based on the mu-law and a-law encoding techniques. The mu-law technique is used in North America and the a-law technique is used in Europe. Both techniques use more bits in encoding lower signal amplitude quantization levels and fewer bits for higher amplitude quantization levels. This is a form of non-linear quantization known as companding (compressing and expanding). Thus, according to the standard, a linear input is received and a compressed logarithmic output is produced. The practical difference between the mu-law technique and the a-law technique is that the former produces the compressed 8-bit output with an extra input bit, whereas the latter does not require the extra bit. Generally speaking, the companding process compresses the range of the signal prior to transmission and expands it afterwards, thereby reducing the overall bandwidth required to transmit the voice signal.

When the G.711 standard is used on a packet network, typically 80 samples of analog speech are encoded into segment of 10 milliseconds length. In other words, at a transmission rate of 64 kilobits per second, each G.711 frame consists of 80 bytes and represents a 10 millisecond segment. Other frame, or segment sizes may be used. For example, segments in the range of 5 mS to 30 mS may be used. The tradeoff is that more overhead and more packets per second, but less packetization delay, are associated for smaller segment sizes, while larger segment sizes allow more efficient compression and lower packet rate, but more delay.

G.711 is relatively simple and the receiving end of the G.711 frames can reproduce the digital sample into high quality speech. More complicated vocoders take the form of code excited linear predictive, or "CELP," models, which are complex algorithms that typically use linear prediction and pitch prediction to model speech signals. Compressed signals generated by CELP vocoders include information that accurately models the vocal track that created the underlying speech signal. In this way, once a CELP-coded signal is decompressed, a human ear may more fully and easily appreciate the associated speech signal.

While CELP vocoders range in degree of efficiency, one of the most efficient is that defined by the G.723.1 standard, as published by the International Telecommunication Union, the entirety of which is incorporated herein by reference. Generally speaking, G.723.1 works by partitioning a 16 bit Pulse Code Modulation(PCM) representation of an original analog speech signal into consecutive segments of 30 ms length and then encoding each of these segments as frames of 240 samples. By design, G.723.1 may operate at a transmission rate of either 5.3 kilobits per second or 6.3 kilobits per second.

Each G.723.1 frame is further divided into four subframes of 60 samples each. For every sub-frame, a 10th order linear prediction coder (LPC) filter is computed using the input signal. The LPC coefficients are used to create line spectrum pairs (LSP), also referred to as LSP vectors, which describe how the originating vocal track is configured and which therefore define important aspects of the underlying speech signal. In a G.723.1 bit stream, each frame is dependent on the preceding frame, because the preceding frame contains information used to predict LSP vectors and pitch information for the current frame.

For every two G.723.1 sub-frames (i.e., every 120 samples), an open loop pitch period (OLP) is computed using the weighted speech signal. This estimated pitch period is used in combination with other factors to establish a signal for transmission to the G.723.1 decoder. Additionally, G.723.1 approximates the non-periodic component of the excitation associated with the underlying signal. For the high bit rate (6.3 kilobits per second), multi-pulse maximum likelihood quantization (MP-MLQ) excitation is used, and for the low bit rate (5.3 kilobits per second), an algebraic codebook excitation (ACELP) is used.

A transmission rate of 5.3 kilobits per second would permit 20 bytes to represent each 30 millisecond segment, whereas a transmission rate of 6.3 kilobits per second would permit 24 bytes to represent each 30 millisecond segment. As a result, each G.723.1 frame consists of either 20 or 24 bytes, depending on the selected transmission rate.

In a preferred embodiment in the context of VoIP, both the G.711 and G.723.1 encoding standards simultaneously produce two different sets of data for the identical conversation. After encoding, the preferred embodiment utilizes a high-level time-conscious protocol RTP 312 to transmit the encoded data. The encoded frame of data is inserted as payload into an RTP packet for RTP transmission.

An RTP packet contains, although not exclusively, the RTP header, and the payload data. To assist real time media delivery, the RTP header has fixed fields that include a sequence number and a timestamp, both helpful for error correction in real time applications such as VoIP. In general, a purpose of the sender timestamp is to record the time spacing between packets in a sequence. Therefore, the sender timestamp may identify any suitable time at the transmitting end that is consistent for the packets in a sequence. For instance, without limitation, the sender timestamp may identify when the first sample of the payload in a packet was taken or when the packet was sent into the network.

In this regard, each packet of a real-time media sequence typically represents a successive time block of the underlying media signal. For instance, according to the G.723.1 standard, a 16 bit PCM representation of an original analog speech signal is partitioned into consecutive segments of 30 ms length, and each of these segments is encoded into a frame of 240 samples, represented by either 20 or 24 bytes (depending on a selected transmission rate). The time spacing between each of these frames is significant, as it serves in part to define the underlying signal. For example, under G.723.1, it is important to know that a sequence of four packets were transmitted at times t, t+30 mS, t+60 mS, and t+90 mS. With this inter-packet time spacing information and sequence number information, a receiving device will be able to reconstruct the packet sequence and decode and play out the underlying signal.

As a stream of real-time media packets is created, each packet is sent independently into the network and routed to the receiving end. This is accomplished by RTP working in conjunction with other lower layer transport and network protocols (e.g. IP 316, MAC 318) to deliver the data to the physical layer 320 of the originating node. The physical layer pushes the data out to the packet based network 350. The packets may be sent back-to-back or with a holding time between packets.

In a preferred embodiment, the two different sets of coded data aforementioned are transmitted simultaneously through two separate RTP packet streams. The G.711 stream contains frames of 10 millseconds of sampled audio data, whereas the G.723.1 stream contains 30 millseconds of sampled data. Both streams are frame aligned, it follows that when every three G.711 frames are sent on the G.711 stream, a G.723.1 frame representing the same information in the three sent G.711 frames will be transmitted shortly after on the G.723.1 stream. In an alternative embodiment, the G.711 data frames could, for example, be formed using 5 milliseconds of audio data, and each G.723.1 packet would be sent after six G.711 packets. The packetization rate is a design choice that may be selected based at least in part on the characteristics of the network 350.

Ideally (excepting packet loss, for instance), each packet will then traverse the network and arrive at the destination end, to be decoded and played out to an end user. In the preferred embodiment utilizing 10 milliseconds worth of data packets, the receiving end of the VoIP conversation would preferably decode the frames back into audible signals from the G.711 stream.

Figure 4:
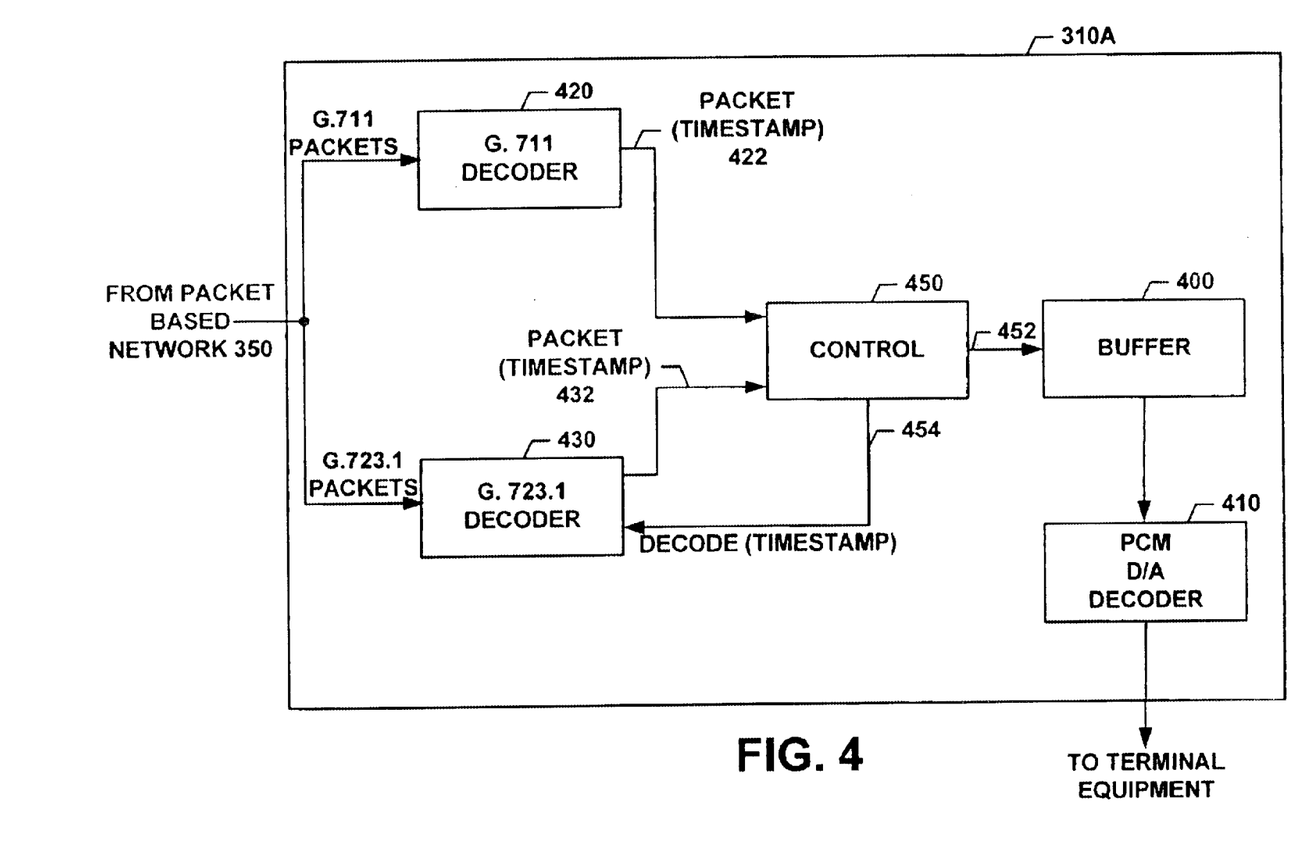
FIG. 4 illustrates a preferred embodiment of the IP telephony vocoder that implements the error correction methods on the received IP telephony signals.

FIG. 4 illustrates an embodiment of a IP telephony interface 310A, according to the present invention, for receiving IP telephony signals. A G.711 decoder 420 and the G.723.1 decoder 430 receive packets from packet based network 350. G.711 decoder 420 decodes the G.711 packets received from network 350 and forwards each packet 422, along with its timestamp, to controller 450.

Controller 450 monitors the timestamps of the G.711 packets 422 that it receives and outputs the digital audio segments as a decoded digital signal 452 from the decoded packets to receive buffer 400. The digital audio segments are then processed by a Digital/Analog converter 410 that converts the linear PCM codes from buffer 400 in sequence in order to produce an analog audio signal for output to a user's terminal equipment. Terminal equipment like a POTS telephone picks up the analog audio signal and delivers the audio information to the user.

When controller 450 detects a gap in the sequence values of the G.711 packets 422, then it sends a decode command 454 containing the timestamp value for the missing G.711 packet to G.723.1 decoder 430. The G.723.1 decoder 430 decodes the G.723.1 packet corresponding to the timestamp value of decode command 454 and sends the data from the G.723.1 packet 432 for the timestamp value back to controller 450. Controller 450 takes the digital audio segment from the G.723.1 packet and places it in buffer 400 in proper sequence.

Controller 450 can easily handle a packet loss on the G.711 stream, because the lost information is recovered from the G.723.1 stream for placement in the receive buffer. This is due to the frame alignment and the timestamp features of RTP, which permits the G.723.1 frame to be easily located from which the FEC information is to be derived and decoded.

It follows that the availability of the different frames renders the transmission of data practically redundant in this embodiment. Upon the loss of any data, FEC allows simultaneous or near-simultaneous recovery from the G.723.1 frames. As a result, in the context of VoIP, the resulting telephone conversation may be carried out in a coherent and satisfying manner, without concern of audio loss in transmission.

In an alternative embodiment, the simultaneous transmission of G.711 and G.723.1 frames uses only one RTP stream. In this manner, the voice signal is, once again, subjected to both G.711 and G.723.1 coding and produces simultaneously two different sets of digital code representing the voice signal. However the transmission method is different. For every 30 millisecond segments of VoIP audio, two 10 milliseconds worth of G.711 frames would be transmitted separately and the remaining 10 milliseconds worth of G.711 frame would be transmitted together with 30 milliseconds worth of a G.723.1 frame generated 30 milliseconds prior. Hence a total of three frames are transferred on a single RTP stream. Once again, in the event of a data loss, the G.723.1 frame already received would be decoded for FEC information.

Figure 5:
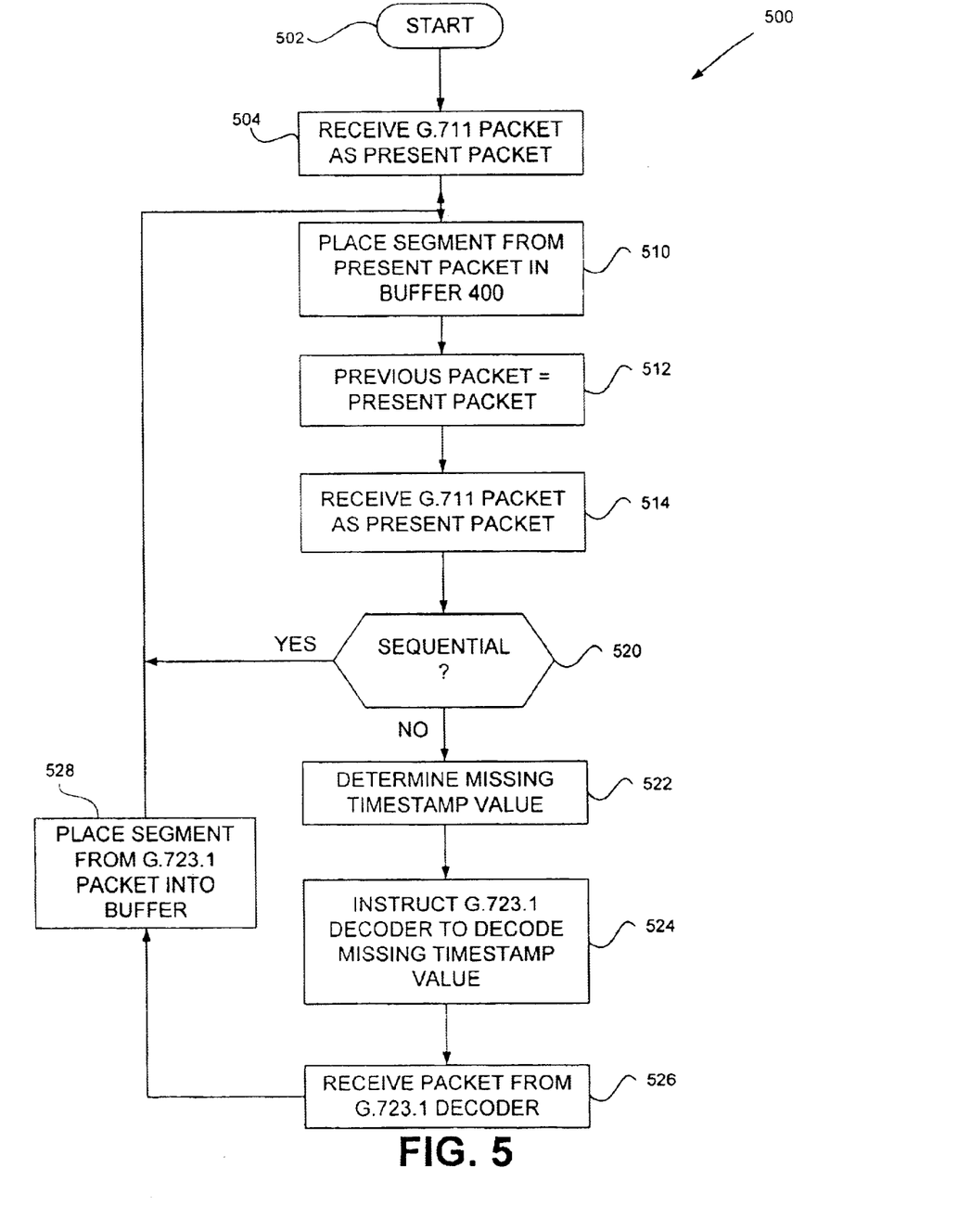
FIG. 5 illustrates an embodiment of a process performed by the controller of FIG. 4.

FIG. 5 is a flow diagram illustrating a simplified embodiment of the process performed by the controller 450 of FIG. 4. When controller 450 initially starts receiving packets from G.711 decoder 420, step 502, it receives a first G.711 packet via connection 422, at step 504, that will be initially treated as a present packet in subsequent steps.

At step 510, controller 450 places the 10 millisecond audio segment from the present packet, which at this point is the first received packet from step 504, into buffer 400. The present packet is then converted to a previous packet at step 512 for processing by subsequent steps. This can be performed in many ways. For instance, if the process is implemented in software, a pointer for the previous packet can be set to a pointer value for the present packet. In a hardware implementation, the contents of a present packet register is loaded into a previous packet register.

At step 514, the next G.711 packet is received as the present packet. At step 520, the controller checks the sequence number of the present packet against the sequence number of the previous packet to determine if they are sequential. If the sequence numbers are sequential, then no G.711 packets have been lost and control flow returns to step 510 for processing of the present G.711 packet.

If, at step 514, the controller detects a gap in the sequence number of the present and previous packets, then it indicates that a G.711 packet was lost in transmission. At this point, control flow branches to step 522 where the value of the missing timestamp is determined. The controller then instructs G.723.1 decoder 430, at step 524, to decode the G.723.1 packet containing the data corresponding to the lost G.711 packet by sending a decode command with the timestamp value determined at step 522.

G.723.1 decoder 430, responsive to the decode command and timestamp signal 454 from controller 450, will decode the G.723.1 packet corresponding to the timestamp value in signal 454 and return the decoded packet 432 to controller 450. At step 526, controller 450 receives the decoded G.723.1 packet from decoder 430 and, at step 528, places the digital audio segment for the lost G.711 packet timestamp value from the decoded G.723.1 packet into buffer 400 in order to fill the gap between the previous and present G.711 packets. Control flow then proceeds to step 510 for processing of the present G.711 packet.

Note that process 500 is a simplified process described in the context of obtaining a single lost packet from corresponding data in a G.723.1 packet. One of ordinary skill in the art will appreciate that process 500 can be readily adapted to detect multiple lost G.711 packets, the corresponding audio data decoded from G.723.1 decoder 430 and the audio data inserted into buffer 400 in the appropriate sequence. One of skill in the art will also readily appreciate that the functionality of process 500 can be implemented in a variety of hardware and software embodiments and combinations of both hardware and software.

A preferred embodiment of the present invention has been described herein. It is to be understood, of course, that changes and modifications may be made in the embodiment without departing from the true scope of the present invention, as defined by the appended claims. The present embodiment preferably includes logic to implement the described methods in software modules as a set of computer executable software instructions. The Computer Processing Unit ("CPU") or microprocessor implements the logic that controls the operation of the transceiver. The microprocessor executes software that can be programmed by those of skill in the art to provide the described functionality.

The software can be represented as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods as described above.

Those methods stored on a computer readable medium may be used to cause a microprocessor to perform those steps. The medium may also contain a data structure, where the data structure includes information used by a communication transceiver, including equalization filter coefficients, an update error threshold, and a first and second update increment value.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry. In particular, it is understood that the filter structures described herein may be implemented in dedicated hardware such as an ASIC, or as program instructions carried out by a microprocessor.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a telecommunications network including a first device and a second device used to transmit multimedia information, an improved method of communicating the multimedia information comprising, in combination:

generating a first data stream containing a first version of vocoded audio information derived from original audio information, wherein the first data stream is representative of the entire original audio information;

generating a redundant data stream containing a second version of vocoded audio information derived from the same said original audio information, wherein the redundant data stream is representative of the entire original audio information;

transmitting said first and redundant data streams in the form of data packets from said first device to said second device;

reproducing said original audio information from said first data stream; and reproducing said original audio information from the redundant data stream in the event that missing or corrupted data occurs in said first data stream.

2. The method as claimed in claim 1, wherein:

said telecommunications network comprises a packet switched network;

said first and redundant data streams comprise data packet streams each defining a sequence of data packets.

3. The method as claimed in claim 1, wherein said first data stream is formed using a G.711 vocoder.

4. The method as claimed in claim 1, wherein said redundant data stream is formed using a G.723.1 vocoder.

5. The method as claimed in claim 1, wherein transmitting said first and redundant data streams includes forming two Real Time Protocol (RTP) packet streams.

6. The method as claimed in claim 1, wherein the first data stream is formed using a G.711 vocoder, the redundant data stream is formed using a G.723.1 vocoder, and the step of reproducing said original audio information from said first data stream includes forming an audio signal from the G.711 data stream.

7. The method as claimed in claim 6, further comprising the step of inserting data from the G.711 packets into a receive buffer.

8. The method as claimed in claim 1 wherein the step of reproducing said original audio information from the redundant data stream includes decoding the G.723.1 packets.

9. The method as claimed in claim 1, wherein the step of reproducing said original audio information from the redundant data stream in the event that missing or corrupted data occurs in said first data stream includes:

monitoring sequence numbers and timestamp values of packets in said first data stream;

detecting a gap in the sequence number of packets in said first data stream;

determining a missing timestamp value corresponding to the gap in the sequence numbers;

decoding a packet corresponding to the missing timestamp value from the redundant data stream; and inserting data from the packet decoded from the redundant data stream into a portion of the original audio information corresponding to the gap in the timestamp values.

10. In an Internet Protocol (IP) telephony gateway serving as an interface between a telephone device and an IP network, the IP telephony gateway receiving original audio information from the telephone device, an improved forward error correction method comprising, in combination:

generating payload information defined by a first packet sequence and a redundant packet sequence containing the same original audio information, wherein the first packet sequence is obtained by vocoding the original audio information using a first vocoding standard and the redundant packet sequence is obtained by vocoding the original audio information using a second vocoding standard;

transmitting the first packet sequence and the redundant packet sequence on the IP network, for receipt by a remote network device;

reproducing the original audio information from the first packet sequence; and, reproducing the original audio information from the redundant packet sequence in the event that missing or corrupted data occurs in the first packet sequence.

11. The method of claim 10 wherein the packet sequences are transmitted using two independent data streams.

12. The method of claim 10 wherein the packet sequences are transmitted using a single data stream.

* * * * *